June 24, 1924.

W. C. NEIN ET AL 1,499,323

MEANS FOR CONTROLLING VEHICLES

Filed July 3, 1917

Thomas W. Varley
and William C. Nein INVENTORS

BY

Thomas Howe ATTORNEY

Patented June 24, 1924.

1,499,323

UNITED STATES PATENT OFFICE.

WILLIAM C. NEIN AND THOMAS W. VARLEY, OF NEW YORK, N. Y.

MEANS FOR CONTROLLING VEHICLES.

Application filed July 3, 1917. Serial No. 178,433.

*To all whom it may concern:*

Be it known that we, WILLIAM C. NEIN and THOMAS W. VARLEY, citizens of the United States, residing at city and State of New York and county of Bronx, and city, county, and State of New York, respectively, have invented new and useful Improvements in Means for Controlling Vehicles, of which the following is a specification.

This invention relates to means for controlling vehicles and especially railway trains.

The main object of the invention is to provide a system of control which requires the actuation of a device by the operator at suitable intervals in order that the vehicle may continue its progress.

In the so called "deadman's" arrangements it is simply necessary that the operator should hold the controller in a running position, the controller returning to "off" position automatically if the restraining hand of the operator is removed. This only requires that the operator shall be in a passive condition as regards his control of the train and his thoughts may almost as well wander from his work as if he were not required to hold the controller in a running position; he may even block or tie the controller in running position. According to the present invention, the operator cannot allow his attention to drift from his work, or at least not for such a length of time as would be injurious, because he is required to positively actuate something (not merely passively hold something) in order to keep his vehicle running.

A further object of the invention is to provide means controlled according to the distance traveled by the vehicle for compelling the attention of the operator.

Another object of the invention is the provision of means compelling the operator's attention affected by the speed of the vehicle.

Another object of the invention is to provide means for compelling the operator's attention which is affected by both the speed of and the distance traveled by the vehicle.

Another object of the invention is to provide suitable signals so that the operator may be apprised of conditions and give suitable attention.

Other and ancillary objects of the invention will appear hereinafter.

In the accompanying drawings which illustrate the invention,

Figure 1:
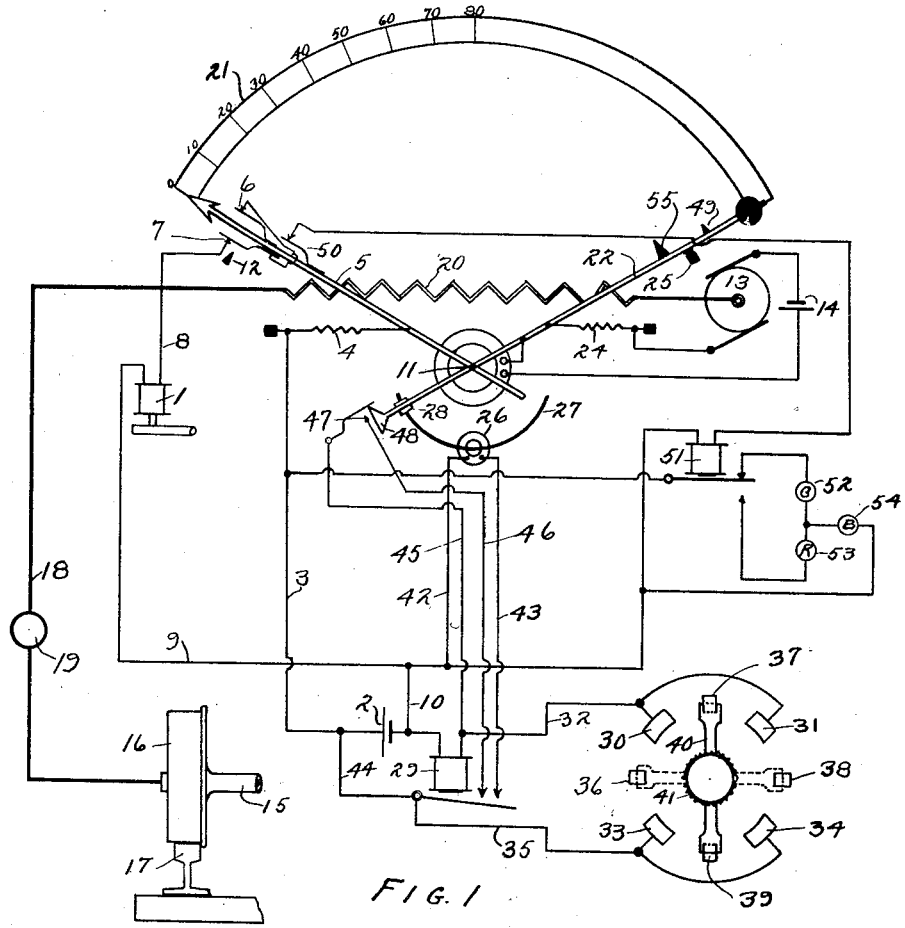
Fig. 1 is a diagram of apparatus and electrical connections showing a system embodying the invention.
Figure 2:
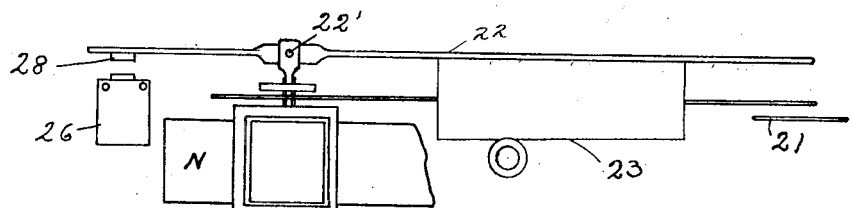
Fig. 2 is an elevation of contact mechanism controlled according to the speed of and distance traveled by the vehicle.

The electro-magnet 1 when it is energized, holds closed a vent valve to prevent the application of the air brakes.

The electromagnet is connected in circuit with the battery 2, through the conductor 3, spring 4 attached to the speed indicating needle 5, the contacts 7 which are insulated from the needle 5 and the contacts 6 (one of which is insulated from the needle), the conductor 8 and the conductors 9 and 10. Electrical contact is maintained at 6, 7 and 50 during the entire swing of needle 5 except when contact 7 is broken by needle 5 swinging against stop 12 and contacts 6 and 50 are broken by 49 and 55 respectively as hereinafter described. The contacts 7 are opened, so that the electromagnet 1 is de-energized and the brake applied, when the needle 5, which is pivoted at 11, is drawn into its extreme left hand position by the spring 4. Under such circumstances the spring contact of the pair 7 which is mounted on the needle 5, comes against the stationary stop 12, which pushes the contacts apart. This can only occur upon a derangement of the apparatus as will be hereinafter referred to.

The needle 5 is fixed to the spindle of a d'Arsonval type of instrument, which may be of the well known Weston structure as employed in voltmeters or ammeters. This instrument is adapted for operation by direct current and acts responsively to the voltage of a direct current generator 13, connected in series with a battery 14, the voltages of the battery and generator being cumulative. One terminal of the generator is connected with one terminal of the coil of the instrument through the spring 24 and arm 22 while the terminal of the battery of opposite polarity is connected with the other terminal of the instrument coil. The armature of the generator 13 is driven from the axle 15 of the vehicle of which one of the wheels 16 is shown resting upon one of the track rails 17. The driving connection with the generator is made through a flexible drive shaft 18 in which is inserted a unidirectional drive 19, which turns the worm 20, the other end of the worm being connected with the shaft of the armature of the generator 13. When, therefore, the vehicle is standing still, the coil actuating the needle 5, will be acted upon by the voltage of the battery 14, the generating windings of the generator 13, serving merely to establish the circuit, and this is sufficient to move the needle 5 from its extreme left hand position into the zero position of the scale 21, thereby moving the contacts 7 out of the range of action of the stop 12 so that the last mentioned contacts are closed, the electro-magnet 1, energized and the brakes held in inoperative position. If anything should occur to derange the circuit of the battery 14 through the coil of the speed indicating instrument, the needle 5 would be pulled to its extreme left hand position, opening the contacts 7, and the applying the brakes so that unavoidable announcement of the derangement of the circuit would be given. It will be seen that the generator 13 will be driven at a speed proportional to the speed of rotation of the vehicle axle 15 and therefore, to the speed of the train along the track, and ordinarily the voltage of the battery 14 will be substantially constant, consequently the displacement of the needle 5 will be substantially proportional to the speed of the vehicle along the track and this speed may be indicated by calibrations, as in miles per hour, on the scale 21.

The arm 22 is pivoted with its axis in line with that of the pivot of the needle 5 so that it may swing in a plane parallel to the plane of movement of the needle, and is also pivoted at 22' so that it may move in a plane at right angles to the first mentioned plane. The first pivoting, that is about the axis in line with the pivotal axis of the needle 5, permits the arm 22 to move under the action of the worm 20, which engages with a projection 23 upon the arm 22. The arm 22 will thus move about the common pivotal axis of itself and the needle 5, the distance moved by the arm in any given time being proportional to the distance moved by the vehicle along the track. A spring 24 secured at one end to the arm 22, and at the other end to a stationary abutment, tends to move the arm 22 to the right, it being stopped by the abutment 25 at the limit of its movement. The arm 22 may be released from the worm 20 by means of an electromagnet 26, having an extended and curved pole face 27, so that it will be at all times in operative relation to the armature 28 fixed to the tail of the arm 22. When the magnet 26 is energized, the tail of the arm 22 will be drawn downwardly, projection 23 withdrawn from the worm, and the spring 24 will draw the arm against the stop 25. The electromagnet 26 is energized from the battery 2, its circuit being controlled by a relay 29. The circuit of this relay through the battery 2, may be controlled by means of a snap switch comprising live contacts 30 and 31 connected by a conductor 32 with one terminal of the relay and live contacts 33 and 34 connected by a conductor 35 with one terminal of the battery, the other terminal of the battery being connected with the other terminal of the relay. The snap switch also comprises dead or unconnected studs 36, 37, 38 and 39 located between the live contacts as indicated and serving to support the ends of the pivoted contact bar 40 when it is between the live contacts. This contact bar is operated by the finger piece 41 through any suitable or well known means for giving a snap action to the bar so that it is alternately moved from resting upon one inoperative pair of studs as 37 and 39, to a position at right angles thereto, so as to rest upon another pair of inactive studs as 36 and 38, and in passing from one of these positions to the other its ends wipe across a pair of active contacts, thereby completing the circuit of the relay. The relay will then pick up and a circuit will be established from one terminal of the battery 2 through the conductors 10 and 42 to one terminal of the magnet 26 and the other terminal of that magnet is connected with the other terminal of the battery through conductors 43, the tongue of the relay 29 and conductor 44. Further, a locking circuit for the relay 29 is formed through the conductors 45 and 46 and the spring contacts 47 adapted to be pushed open by an insulating projection 48 upon the tail end of the arm 22 when the latter is substantially at the right hand limit of its movement. When the arm is moved to the left, the contacts 47 are permitted to close. When, therefore, the snap switch is operated by a step, the relay 29 is energized and lifts its tongue and thereby closes the circuit of the magnet 26, which attracts the tail end of the arm 22, thereby disengaging the bar from the worm. The arm is then moved against the stop 25 by the spring 24; the contacts 47 remaining closed until the arm has substantially completed its movement, thereby locking the relay 29 energized and maintaining the magnet 26 energized until the arm has substantially completed its movement to the right when contacts 47 will be opened by the projection 48, the relay 29 be de-energized and the circuit of the magnet 26 broken.

By the operation of the snap switch, the arm 22 may be returned to the right at any time, but if the snap switch is not operated, the arm will continue to move under the action of the worm until it comes into engagement with the needle 5. The needle 5 will take up a position upon the scale 21, as before indicated, according to the speed of the vehicle. If, therefore, the snap switch is not attended to so as to return the arm 22 before its engagement with the needle 5, the insulating projection 49 will push open the spring contacts 6 on the needle, thereby opening the circuit of the electro-magnet 1, and permit the brakes to be applied.

In order that the engineer may be advised of the imminence of the application of the brakes, a pair of spring contacts 50 are mounted on the needle 5 and control the circuit of a signal controlling relay 51. The signals may be a green lamp 52 for indicating to the engineer, that his attention is not necessary, and a red lamp 53 for indicating a danger condition or that it is necessary for him to operate the snap switch, to return the arm 22 if the stopping of the train is to be avoided and a bell 54 of the gong type, which gives an impulse to the clapper and a stroke to the bell on each make and break of its circuit. Normally the spring contacts 50 are closed so that the circuit of the relay 51 is made across the battery 2 and the relay being thus energized, its tongue is picked up, thereby closing the circuit of the green lamp and gong 54 across the terminals of the battery 2. When the contacts 50 are opened, which is accomplished by the insulated projection 55 on the arm 22, a short interval before the contacts 6 are opened by the projection 49, the circuit of the relay 51 will be de-energized and its tongue will drop. The circuit through the green light 52 will thereupon be broken when the circuit through the red light 53 will be made at the back contact of the relay. Also this making and breaking of the circuit, will cause a stroke of the clapper of the gong 54. Upon movement of the arm 22 away from the needle, the spring contacts 50 will be permitted to close, thereby restoring the circuit of the relay 51 when it will again pick up and, breaking the circuit of the red light 53, the circuit of the green light will be restored accompanied by a stroke of the gong.

All of the foregoing controlling apparatus and circuits are mounted upon the vehicle so that no track equipment or modification is required.

It will now be seen that with the vehicle at rest, the speed indicating needle 5 will stand at zero of the scale, and the brake controlling magnet 1 will be energized. As the train or vehicle moves, the needle 5 will assume a position according to the speed of the train and the worm 20 will carry the arm 22 to the left. This action will continue, namely the needle 5 positioning itself according to the speed of the vehicle, while the arm 22 will move proportionately to the distance traveled, as the motion of the vehicle continues, and the arm 22 will, unless previously arrested, come into such position that its projection 55 will open the contacts 50, thereby extinguishing the green light 52 and lighting the red light 53, the gong 54 being sounded by the making and breaking of the circuit. At a short interval thereafter, the projection 49 upon the arm 22 will open the contacts 6, thereby depriving the magnet 1 of current and causing the brakes to be applied.

It will now be seen that the higher the speed, the further to the right will the speed indicating needle 5 take up its position so that the distance which must be traveled by the arm 22 before it comes into engagement with the needle 5, will be shortened; moreover this distance will be traversed more quickly by the arm 22 at high speed because a given distance will be covered by the train in a shorter time.

The arm 40 of the snap switch being normally in disconnecting position as shown, will energize the relay 29 momentarily when actuated as before described. Immediately that the tongue of the relay has been picked up, its circuit will be locked and it will also close the circuit of the magnet 26 which will release the arm 22 from the worm, so that it can be returned to the initial position as shown in the drawing. At this position it will have opened the circuit of the relay 29 at the contacts 47 and, the relay having dropped its tongue, the circuit of the magnet 26 will be broken and allow the arm 22 to be drawn into engagement with the worm 20 by the spring 24. The arm 22 will then recommence its travel to the left which will eventually result in the application of the brakes as before described, except that the operator actuates the snap switch when it will be disengaged from the worm and returned to its right hand position as just described. It therefore appears that it is necessary for the operator to actuate the snap switch to prevent the application of the brakes, that after such actuation the apparatus will again take up its excursion which may result in the application of the brakes, and that it must be again arrested in time to prevent such result if the vehicle is to be maintained in its condition of progress along the track. It is thus seen that in order to maintain the condition of progress of the vehicle along the track, it is necessary for the operator to intermittently actuate the snap switch, and that this actuation must be more frequent and so require closer attention at high speeds than at low speeds.

Figure 3:
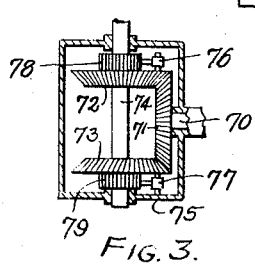
Fig. 3 is a detailed view of a unidirectional device for conveying movement from the wheel axle to an actuated worm, parts being shown in section.

Fig. 3 illustrates a form of the unidirectional device 19, which is here shown as comprising a shaft 70 which is connected with the wheel axle, a gear wheel 71 fixed upon the shaft 70 and meshing with gears 72 and 73 loosely mounted and freely rotatable on shaft 74 mounted in bearings in the housing 75. The gears 72 and 73 carry respectively pawls 76 and 77 taking into ratchets 78 and 79 respectively, which ratchets are fixed on the shaft 74, which is connected to the shaft leading to the worm 20. This is a well known form of unidirectional device for, in which ever direction the shaft 70 is turned, the shaft 74 will rotate in but one direction. The gear 71 will drive the gears 72 and 73 in opposite directions and it is only that gear which is turning in a particular direction (whatever may be the direction of rotation of the gear 71), which will be connected into driving engagement with the shaft 74 by its pawl and ratchet.

While the invention has been illustrated in what is considered its best application, it may have other embodiments without departing from its spirit, and is not, therefore, limited to the structures shown in the drawing.

What we claim is—

1. The combination with a vehicle, of means for affecting the progress of the vehicle, said means being normally biased during the movement of the vehicle to produce its effect upon the progress of the vehicle, and means requiring intermittent actuation by the operator to avoid the effect of said bias on the progress of the vehicle.

2. The combination with a vehicle, of means controlled by the movement of the vehicle for affecting its progress, said means being normally biased during the movement of the vehicle to produce its effect upon the progress of the vehicle, and means requiring actuation by the operator to avoid the effect of said bias on the progress of the vehicle.

3. The combination with a vehicle, of means controlled by the distance traveled by the vehicle for affecting its progress, said means being normally biased during the movement of the vehicle to produce its effect upon the progress of the vehicle, and means requiring actuation by the operator to avoid the effect of said bias on the progress of the vehicle.

4. The combination with a vehicle, of means controlled by the speed of the vehicle for affecting its progress, said means being biased to produce its effect upon the progress of the vehicle, and means requiring actuation by the operator to avoid the effect of said bias on the progress of the vehicle.

5. The combination with a vehicle, of means controlled by the speed of and the distance traveled by the vehicle for affecting its progress, said means being biased to produce its effect upon the progress of the vehicle, and means requiring actuation by the operator to avoid the effect of said bias on the progress of the vehicle.

6. The combination with a vehicle, of means for slowing the vehicle, means for controlling the aforesaid means, and normally biased during the movement of the vehicle to operate said controlling means to slow the vehicle and adapted to operate said means for slowing the vehicle after an interval unless action is taken to prevent it and means requiring actuation by the operator to avoid the slowing of the vehicle under the operation of said bias.

7. The combination with a vehicle, of a brake therefor, means normally tending during the movement of the vehicle to cause the application of said brake and adapted to operate said means for applying the brake after an interval unless action is taken to prevent it and means requiring actuation by the operator for preventing the application of the brake by the operation of such tendency.

8. The combination with a vehicle, of a brake therefor, contacts and circuits for controlling said brakes, a member driven from a moving part of said vehicle for controlling said contacts and means requiring actuation by the operator for preventing said member from affecting said contacts.

9. The combination with a vehicle, of means controlled by the movement of the vehicle for affecting its progress, said means being biased to produce its effect upon the progress of the vehicle, means requiring actuation by the operator to avoid the effect of said bias on the progress of the vehicle, and a signal for advising the operator when the last mentioned means should be operated.

10. The combination with a vehicle, of a brake therefor, contacts and circuits for controlling said brakes, means for controlling said contacts comprising a member driven from a moving part of the vehicle and a member moved according to the speed of the vehicle, and means requiring actuation by the operator for preventing said contacts from being affected by the aforesaid means.

11. The combination with a vehicle, of a movable member thereon, gearing between said member and the wheels of the vehicle, said gearing being normally in engagement, means affecting the progress of said vehicle controlled by said member and means for disengaging said gearing at will.

12. The combination with a vehicle, of means controlling the progress of the vehicle, an arm, means for driving said arm in one direction from the wheels of the vehicle, said arm operating said controlling means when its movement is continued sufficiently in said direction, means for releasing said arm from said driving means at will and means for moving said arm in the opposite direction.

13. The combination with a vehicle, of means controlling the progress of the vehicle, an arm controlling said means, having an initial position, means for moving said arm from said position to actuate said controlling means and means for returning said arm to said position at will.

14. The combination with a vehicle, of means controlling the progress of the vehicle, an arm controlling said means having an initial position at a distance from the operating point of said controlling means, gearing connecting the wheels of said vehicle with said arm for moving it from said position to said point and means for returning said arm to its initial position at will.

15. The combination with a vehicle, of means controlling the progress of the vehicle, an arm controlling said means having an initial position at a distance from the operating point of said controlling means, gearing connecting the wheels of said vehicle with said arm for moving it from said position to said point, means for returning said arm to its initial position at will, and means for adjusting the location of said point according to the speed of the vehicle.

16. The combination with a vehicle, of means for affecting the progress of the vehicle, means tending to operate the aforesaid means to affect the progress of the vehicle and means for controlling the last aforesaid means, said controlling means including a device requiring intermittent, positive actuation by the operator to avoid affecting the progress of said vehicle, the duration of operation of said device being independent of the action of the operator.

17. In a safety brake apparatus, means upon the vehicle sufficient within itself for automatically applying the brake and a manipulative device for preventing the operation of said means by repeated periodic operation of said device.

18. The combination with a vehicle of brakes therefor, means tending during movement of the vehicle to apply said brakes, a magnet for controlling said means and an electric circuit for said magnet including a manipulative switch.

19. The combination with a vehicle of brakes therefor, means tending during movement of the vehicle to apply said brakes, a magnet for controlling said means and an electric circuit for said magnet including a manipulative snap switch.

In testimony whereof we have signed this specification this 30th day of June, 1917.

THOMAS W. VARLEY.
WILLIAM C. NEIN.